(12) United States Patent
Demmig et al.

(10) Patent No.: US 8,951,642 B2
(45) Date of Patent: Feb. 10, 2015

(54) AQUEOUS TWO-COMPONENT DISPERSION ADHESIVE

(75) Inventors: Martin Demmig, Quickborn (DE); Andre Buchholz, Ritterhude (DE); Christina Bosse, Hamburg (DE); Tino Bendkowski, Kummerfeld (DE)

(73) Assignee: Sika Technology AG, Baar (CH)

( * ) Notice: Subject to any disclaimer, the term of this patent is extended or adjusted under 35 U.S.C. 154(b) by 61 days.

(21) Appl. No.: 13/504,823

(22) PCT Filed: Oct. 12, 2010

(86) PCT No.: PCT/EP2010/065250
§ 371 (c)(1),
(2), (4) Date: May 25, 2012

(87) PCT Pub. No.: WO2011/051100
PCT Pub. Date: May 5, 2011

(65) Prior Publication Data
US 2012/0258317 A1 Oct. 11, 2012

(30) Foreign Application Priority Data

Oct. 27, 2009 (EP) .................................. 09174217

(51) Int. Cl.
*B32B 27/40* (2006.01)
*C09J 175/08* (2006.01)
*C09J 175/04* (2006.01)
*C09J 131/04* (2006.01)

(52) U.S. Cl.
USPC ...................... 428/423.1; 156/331.7; 524/503

(58) Field of Classification Search
USPC ...................... 428/423.1; 156/331.7; 524/503
See application file for complete search history.

(56) References Cited

U.S. PATENT DOCUMENTS

| 5,821,297 A | 10/1998 | Arnold et al. |
| 5,852,105 A * | 12/1998 | Wustefeld et al. ............ 524/591 |
| 6,180,244 B1 * | 1/2001 | Rayner et al. .............. 428/424.8 |
| 6,964,986 B2 * | 11/2005 | Bachon et al. .................... 524/2 |
| 2004/0229046 A1 | 11/2004 | Chao et al. |
| 2007/0277450 A1 * | 12/2007 | Raulie ........................... 52/90.1 |

(Continued)

FOREIGN PATENT DOCUMENTS

| EP | 0 702 071 A2 | 3/1996 | |
| JP | 2004197049 A * | 7/2004 | ............ C09J 175/04 |
| WO | WO 94/21743 | 9/1994 | |

OTHER PUBLICATIONS

May 18, 2012 Translation of International Preliminary Report on Patentability issued in International Patent Application No. PCT/EP2010/065250.

(Continued)

*Primary Examiner* — Thao T. Tran
(74) *Attorney, Agent, or Firm* — Oliff PLC

(57) ABSTRACT

An aqueous two-component aqueous dispersion adhesives, including in particular polyether-polyurethane polymers and ethylene vinyl acetate copolymers (EVA) having a glass transition temperature of greater than 0° C. The dispersion adhesives are optimally suited for use as contact adhesives, and for gluing plastic membranes. It has been demonstrated that the adhesives or the adhesive composite items produced therewith are characterized by an exceptionally low plasticizer absorption behavior, and contact adhesion. The good heat resistance and good bonding to various bases are also advantageous.

15 Claims, 1 Drawing Sheet

(56) References Cited

U.S. PATENT DOCUMENTS

2009/0056873 A1* 3/2009 Schumacher et al. ........ 156/329
2009/0194232 A1* 8/2009 Schumacher et al. ........ 156/329

OTHER PUBLICATIONS

Sep. 5, 2011 International Search Report issued in International Patent Application No. PCT/EP2010/065250.

* cited by examiner

AQUEOUS TWO-COMPONENT DISPERSION ADHESIVE

TECHNICAL FIELD

The invention relates to the field of dispersion adhesives.

PRIOR ART

Dispersion adhesives have been known for some time and are particularly used in the packaging industry.

Compared to the solvent-based dispersion adhesives, aqueous dispersion adhesives provide great advantages with respect to ecology, safety, and industrial hygiene, which is why there is a very high demand for aqueous dispersion adhesives in the market place. A disadvantage of the aqueous dispersion adhesives, however, is often insufficient storage stability.

Certain dispersion adhesives, in particular, solvent-containing dispersion adhesives can be used as contact adhesives. When using contact adhesives, the adhesive is applied to the surfaces of the substrates to be bonded, flashed off, and then joined together (contacting). Such adhesives exhibit an immediate bond strength after joining, which is a great advantage for many applications. To achieve this kind of contact adhesion, such contact adhesives contain, in particular, plasticizers and/or polymers with very low glass transition temperatures.

In gluing plastic membranes, there is a fundamental difficulty in that the typical membranes used contain large amounts of plasticizer, and that this plasticizer displays a tendency to migrate into the adhesive, whereby on the one hand the membrane embrittles and on the other, the mechanical properties of the adhesive are adversely affected by the absorbed plasticizer, thus resulting in adhesive failure in just a short time. Additionally, this process is accelerated by thermal effects. It has been shown that the uptake of plasticizer is due mainly to polymers having very low glass transition temperatures.

SUMMARY OF THE INVENTION

The object of the present invention is therefore to provide an aqueous dispersion adhesive which exhibits at the same time the properties of low softening-agent absorption and a capacity for contact adhesion. It has now surprisingly been found that an aqueous two-component dispersion adhesive according to claim can solve this problem.

This dispersion adhesive also exhibits ecological, safety and industrial hygiene benefits that are typical of aqueous dispersion adhesives. In preferred embodiments, dispersion adhesives can be produced which are free of VOCs. In particular, the aqueous dispersion adhesives can be formulated with excellent stability on storage. Furthermore, it has been shown that these adhesives are perfectly suitable for gluing plastic membranes, in particular by contact bonding. It has also been shown that the adhesives have an extremely good range of adhesion and can bond very well, among other things, polyolefin. The bonding is in fact such that in most cases, the use of a primer can be omitted. Thus, the primer-less gluing of plastic membranes is a further and extremely surprising advantage of the present dispersion adhesives. Finally, it has been found that the adhesion has an extremely good heat resistance.

It has been proven that a particularly suitable area of application of the adhesives is the gluing of plastic membranes onto roofs.

Here, the advantages of low plasticizer absorption, contact adhesion and heat resistance become particularly noticeable.

Other aspects of the invention are the subject of further independent claims. Particularly preferred embodiments of the invention are the subject matter of the dependent claims.

WAYS OF CARRYING OUT THE INVENTION

In a first aspect, the present invention relates to a two-component aqueous dispersion adhesive which consists of two components.

The first component (K1) in this case contains
at least one polyether-polyurethane polymer (PEPU);
at least one ethylene vinyl acetate copolymer (EVA) having a glass transition temperature of greater than 0° C.; and
water.

The second component (K2) in this case contains at least one polyisocyanate.

The first component (K1) contains at least one polyether-polyurethane polymer (PEPU). In the present document, polyether-polyurethane polymer refers to a polymer, which is the result of the reaction of at least one polyether polyol and at least one polyisocyanate, and in such a way that the polyether-polyurethane polymers have hydroxyl groups.

Particularly suitable as polyether polyols are polyoxyalkylene polyols, also referred to as oligoetherols, which are polymerization products of ethylene oxide; 1,2-propylene oxide; 1,2- or 2,3-butylene oxide, oxetane, tetrahydrofuran, or mixtures thereof, possibly polymerized using a starter molecule with two or several active hydrogen atoms such as water, ammonia, or compounds having two or more OH or NH groups such as 1,2-ethanediol; 1,2- and 1,3-propanediol, neopentyl glycol, diethylene glycol, triethylene glycol, the isomeric dipropylene glycols and tripropylene glycols; the isomeric butane diols, pentane diols, hexane diols, heptane diols, octane diols, nonane diols, decane diols, undecane diols; 1,3- and 1,4-cyclohexanedimethanol, bisphenol A, hydrogenated bisphenol A; 1,1,1-trimethylolethane; 1,1,1-trimethylolpropane, glycerol, aniline, and mixtures of the aforementioned compounds. Both polyoxyalkylene polyols, which exhibit a low degree of unsaturation (measured according to ASTM D 2849-69 and expressed in milliequivalents of unsaturation per gram of polyol (mEq/g)), for example produced using so-called double-metal cyanide-complex catalysts (DMC catalysts), as well as polyoxyalkylene polyols with a higher degree of unsaturation, for example produced using anionic catalysts such as NaOH, KOH, CsOH, or alkali alkoxides.

Especially suitable are polyoxyalkylene diols and triols with a degree of unsaturation below 0.02 mEq/g and with a molecular weight ranging from 1,000-30,000 g/mol, as well as polyoxypropylene diols and trials with a molecular weight of 400-8,000 g/mol. Also particularly suitable are so-called ethylene-oxide-terminated ("EO-endcapped", ethylene-oxide-endcapped)polyoxypropylene polyols. The latter are special polyoxypropylene polyoxyethylene polyols which are obtained, for example, in that after completion of the polypropoxylation reaction with ethylene oxide pure polyoxypropylene polyols, more particularly polyoxypropylene diols and triols are alkoxylated further and thus exhibit primary hydroxyl groups.

It is further preferred to use polyether polyols with ionic, especially anionic groups, or in addition to the polyether polyols to even use polyols with ionic, especially anionic groups. Preferred anionic groups include sulfonate or carboxylate groups. Particularly suitable as such polyols with ionic, especially anionic, groups are dihydroxyalkylcarboxylic acid salts, such as dimethylol propionic acid salts or structurally similar diolcarboxylic acid salts. Instead of using the substances with anionic groups directly, the corresponding protonated forms can also be used, and the polyether-polyurethane polymer formed subsequently can be neutralized, i.e. deprotonated, with a base, in particular by means of a tertiary amine, so that the polyether-polyurethane polymer (PEPU) exhibits anionic groups.

Aromatic or aliphatic polyisocyanates, in particular the diisocyanates are preferably used as polyisocyanates for the production of polyether-polyurethane polymer (PEPU).

Suitable as aromatic polyisocyanates are, in particular, monomeric di- or triisocyanates such as 2,4- and 2,6-toluene diisocyanate and any mixtures of these isomers (TDI); 4,4'-, 2,4'- and 2,2'-diphenylmethane diisocyanate and any mixtures of these isomers (MDI), mixtures of MDI and MDI homologues (polymeric MDI or PMDI); 1,3- and 1,4-phenylene diisocyanate; 2,3,5,6-tetramethyl-1,4-diisocyanatobenzene, naphthalene-1,5-diisocyanate (NDI); 3,3'-dimethyl-4,4'-diisocyanatodiphenyl (TODI), dianisidine diisocyanate (DADI); 1,3,5-tris-(isocyanatomethyl)benzene, tris-(4-isocyanatophenyl)methane, tris-(4-isocyanatophenyl) thiophosphate, oligomers and polymers of the aforementioned isocyanates, and any mixtures of the aforementioned isocyanates.

Suitable as aliphatic polyisocyanates are, in particular, monomeric di-or triisocyanates such as 1,4-tetramethylene diisocyanate, 2-methyl-pentamethylene-1,5-diisocyanate; 1,6-hexamethylene diisocyanate (HDI); 2,2,4- and 2,4,4-trimethyl-1,6-hexamethylene diisocyanate (TMDI); 1,10-decamethylene diisocyanate; 1,12-dodecamethylene diisocyanate, lysine and lysine-ester diisocyanate, cyclohexane-1,3- and 1,4-diisocyanate, 1-methyl-2,4- and -2,6-diisocyanatocyclohexane, and any mixtures of these isomers (HTDI or $H_6TDI$), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}MDI$); 1,4-diisocyanato-2,2,6-trimethylcyclohexane (TMCDI); 1,3- and 1,4-bis-isocyanatomethyl)-cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)-naphthalene, dimer and trimer fatty acid isocyanates such as 3,6-bis-(9-isocyanatononyl)-4,5-di-(1-heptenyl)-cyclohexene (dimeryl diisocyanate); $\alpha,\alpha,\alpha',\alpha',\alpha'',\alpha''$-hexamethyl-1,3,5-mesitylene triisocyanate, oligomers, and polymers of the aforementioned isocyanates, and any mixtures of the aforementioned isocyanates. HDI and IPDI are preferred.

Aliphatic or cycloaliphatic polyisocyanates are preferred as the polyisocyanates.

Dimers and trimers such as isocyanurates or biurets are considered oligomers of the aforementioned isocyanates.

The polyether-polyurethane polymer (PEPU) exhibits a mean molecular weight of preferably 500 g/mol or higher. In particular, the average molecular weight has a value of 1000 to 30,000 g/mol, preferably from 2000 to 10,000 g/mol.

Preferably, the polyether-polyurethane polymer (PEPU) exhibits anionic groups.

The polyether-polyurethane polymers (PEPU) can be produced either in a one step process directly from the at least one polyether polyol and the at least one polyisocyanate, in which the polyol is present in stoichiometric excess, so that that the polyether-polyurethane polymer exhibits free hydroxyl groups, or it can be obtained by a multi-step process, for example, by a superstoichiometric reaction of a polyol with an isocyanate-terminated polyurethane, which in turn is produced in a first step from the at least one polyether polyol and the at least one polyisocyanate.

Preferred is a method, wherein in a first step an isocyanate-group-terminated polyurethane prepolymer is produced from at least one polyether polyol and at least one polyisocyanate, and in a second step the prepolymer is reacted with a polyol exhibiting a superstoichiometric amount of a carboxyl group, in particular dimethylol propionic acid, perhaps in an admixture of a diol, and subsequent neutralization, in particular by adding a tertiary amine to an anionic polyether-polyurethane polymer (PEPU), and which therefore exhibits both hydroxyl and carbonate groups.

Preferably, the polyether-polyurethane polymer (PEPU) is alkaline.

The polyether nature of the polyether-polyurethane polymer (PEPU) is essential to the essence of the invention. It has been found that by using corresponding polyester polyurethane polymers, i.e., polyurethane polymers made from polyester polyols and the corresponding polyisocyanates, the main advantages of the invention do not occur.

Preferably, the polyether-polyurethane polymers (PEPU) for producing the first component (K1) are used as a dispersion. Such dispersions are commercially available and exhibit a typical solids content of 30-50 wt. % and a typical viscosity at room temperature between 10 and 500 mPa·sec (Brookfield).

The amount of polyether-polyurethane polymer (PEPU) is preferably 5 to 45 wt. %, particularly 5 to 30 wt. %, based on the weight of the first component (K1).

The first component (K1) further contains at least one ethylene vinyl acetate copolymer (EVA) having a glass transition temperature of greater than 0° C.

Ethylene vinyl acetate copolymers are compounds familiar to the person skilled in the art and are readily available commercially. Preferably, the ethylene vinyl acetate copolymer exhibits a molar excess of the structural element which originates from ethylene, relative to the structural element which originates from vinyl acetate. Ethylene vinyl acetate copolymers with such an ethylene/vinyl acetate ratio of 52:48 to 65:35 are preferred.

Particularly suitable are such ethylene vinyl acetate copolymers, which are recommended by the manufacturer for use in dispersions.

The ethylene vinyl acetate copolymer (EVA) exhibits a glass transition temperature of greater than 0° C. In the present document, glass transition temperatures are understood to mean glass transition temperatures, which were measured by differential scanning calorimetry (DSC), wherein the sample was first cooled from room temperature to −50° C. at a cooling rate of 10° K/min, held at this temperature for 5 minutes, and then heated to 100° C. at a heating rate of 10° K/min and measured. The inflection point of the measured DSC curve is stated as the stated glass transition temperature. DSC curves were measured on a Mettler-Toledo DSC 821e (Huber cryostat TC 100).

For the present invention, it is essential that the glass transition temperatures of the ethylene vinyl acetate copolymer are greater than 0° C.

Preferably, the ethylene vinyl acetate copolymer (EVA) for the production of the first component (K1) is used as dispersion. Such dispersions are commercially available and have a typical solids content of 50-70 wt. % and a typical viscosity at room temperature between 2000 and 8000 mPa·s (Brookfield).

The amount of ethylene vinyl acetate copolymer with a glass transition temperature of greater than 0° C. is preferably 20 to 55 wt. %, in particular 35 to 50 wt. %, based on the weight of the first component (K1).

It is preferred that the weight ratio of ethylene vinyl acetate copolymer (EVA) to polyether-polyurethane polymer (PEPU) has a value from 10 to 0.8, in particular 9 to 1.1, preferably 8 to 1.5.

The first component (K1) further contains water.

The proportion of water is preferably 30-70 wt. %, in particular 30-60 by wt. %, preferably 35-50 wt. %, based on the total weight of the two-component aqueous dispersion adhesive.

If needed, the first component (K1) can contain additional ingredients. In particular, such additional ingredients are those selected from the group consisting of stabilizers, thickeners, anti-aging agents, fungicides, pigments, dyes, wetting agents, antifoaming agents, dispersion aids, film forming agents, matting agents, and fillers.

Advantageously, the first component contains stabilizers. In principle, these are stabilizers, such as those that are commonly used in aqueous dispersions. It has been shown, however, that the use of stabilizers will result in very storage-stable dispersion adhesives, when the stabilizer are selected from the group consisting of wetting agents, cellulose, polyvinyl alcohol and polyvinylpyrrolidone, as well as mixtures thereof.

The first component (K1) typically exhibits a pH of greater than 6. Preferably, the pH is from 7 to 9.

The first component (K1) is a dispersion and preferably has good storage stability at temperatures greater than 0° C., i.e. at room temperature it does not separate even after long storage periods, typically up to 8 months.

Preferably, the first component (K1) is obtained by vigorously mixing an aqueous dispersion of polyether-polyurethane polymer (PEPU) and an aqueous dispersion of ethylene vinyl acetate copolymer having a glass transition temperature of greater than 0° C., and perhaps water and perhaps other ingredients.

The second component (K2) contains at least one polyisocyanate.

Particularly suitable as polyisocyanates are the polyisocyanates already described above for the production of the polyether-polyurethane polymer (PEPU).

The polyisocyanate is preferably a trimer of a diisocyanate, in particular of an aliphatic or cycloaliphatic diisocyanate. Preferably, such trimers are hydrophilized, in particular by polyoxyalkylene residues.

Preferably, the polyisocyanate in the second component (K2) is a trimer of 1,6-hexamethylene diisocyanate (HDI) or 1-isocyanato-3,3,5-trimethyl-5-isocyanatomethyl-cyclohexane (=isophorone diisocyanate or IPDI), preferably of 1-isocyanato-3,3,5-trimethyl-5-isocyanatomethyl-cyclohexane (=isophorone diisocyanate or IPDI).

Particularly preferably, the second component (K2) exhibits a mixture of a trimer of 1,6-hexamethylene diisocyanate (HDI) and a trimer of 1-isocyanato-3,3,5-trimethyl-5-isocyanatomethyl-cyclohexane (=isophorone diisocyanate or IPDI).

The amount of the polyisocyanate in the second component (K2) is preferably such that they result in a ratio of 0.8 to 1.2, preferably of about 1, of the isocyanate groups of the first component (K1) to the hydroxyl groups of the polyether-polyurethane polymer (PEPU) of the first component (K1) of the dispersion adhesive.

If needed, the second component (K2) can contain additional ingredients. In particular, such additional ingredients are selected from the group consisting of stabilizers, thickeners, anti-aging agents, fungicides, pigments, dyes, wetting agents, antifoaming agents, matting agents, high-boiling diluents, and fillers. The high-boiling diluents, sometimes also called extenders, are low-viscosity diluents which preferably are not considered VOCs (Volatile Organic Compounds). Their use facilitates the mixing of the two components.

When sealed and protected from moisture, the second component (K2) has good storage stability at room temperature for long periods, typically up to 8 months.

When stored in separate containers, the above-described two components of the aqueous dispersion adhesive have good storage stability at room temperature. For use, these two components are mixed together and applied within the pot life. In this case, the pot life is preferably at least 8 hours, in particular between 8 and 12 hours. Typically, the mixing can be done by a static mixer or a machine-operated mixer. The mix ratio of the two components (K1:K2) is preferably chosen so that the number of isocyanate groups of the second component (K2) to the number of hydroxyl groups of the polyether-polyurethane polymer (PEPU) of the first component (K1) are in a ratio of 0.8 to 1.2, preferably of about 1.

In one embodiment, the second component (K2) is added with stirring to the first component (K1) which is present in a vessel, for example a bucket, and mixed with a machine-operated mixer.

Typically in the aqueous dispersion adhesive, the weight ratio of the first component (K1) to the second component (K2) has a value of 30 to 5, preferably 25 to 10.

It has proved particularly advantageous if the dispersion adhesive is substantially free of volatile components (VOCs). In the present document, the term "substantially free" means that the proportion of the respective substance is less than 5 wt. %, in particular less than 1 wt. %.

Preferably, the dispersion adhesive is free of volatile components (VOCs). In the present document "volatile organic compounds" or "VOCs" include organic compounds having a boiling point 250° C. at most at standard pressure (1013 mbar) or a vapor pressure of at least 0.1 mbar at 20° C.

Particularly advantageous are aqueous two-component dispersion adhesives, which are free of organic solvents, in particular free of VOCs and/or plasticizers. Both VOCs and organic solvents are disadvantageous from the toxicological and industrial hygiene perspective. Furthermore, plasticizers can migrate to the surface of an adhesive and lead to failure of an adhesion or cause a sticky surface, which leads to contamination of the adhesive joins. Solvents are also undesirable as, on the one hand, they can cause an additional hazard potential during heating and application of the adhesive and, on the other, they migrate too, and can be released into the environment over a long period of time and can give off materials which are in contact with the adhesive, and these can have an adverse effect or can lead to failure of the adhesion.

It has been further proven to be particularly advantageous if the two-component aqueous dispersion adhesive is substantially free of components with aromatic structures.

The above-described two-component aqueous dispersion adhesive is particularly suitable for gluing plastic membranes, in particular in roof construction, which is another aspect of the invention.

The two-component aqueous dispersion adhesive can be used for gluing various substrates. The adhesive can be used in conventional application as a dispersion adhesive. Thus, adhesions may be achieved, for example, in which the adhesive is applied to a substrate, and is subsequently joined to a second substrate. The adhesive can also be used, however—and this is especially advantageous—as a contact adhesive.

In a further aspect, the invention relates to a process for gluing plastic membranes, comprising the steps of
(i) mixing the two components (K1 and K2) of the above-described two-component aqueous dispersion adhesive;
(ii) applying the aqueous dispersion adhesive mixed according to step (i) to the surface of a plastic membrane (S1) and to the surface of a further substrate (S2);
(iii) flashing off the aqueous dispersion adhesive applied according to step (ii);
(iv) joining the plastic membrane (S1) and the further substrate (S2) by contacting the dispersion adhesive present on the plastic membrane (S1) and on the further substrate (S2) and flashed off according to step (iii).

Thus, the two-component aqueous dispersion adhesive is, in particular, a contact adhesive.

Suitable first substrates (S1), i.e. plastic membranes are, in particular, polyvinyl chloride (PVC), in particular, soft PVC, or polyolefins, in particular polyethylene or polypropylene.

In the present document, "membrane" or "plastic membrane" is understood as, in particular, flexible planar plastics in a thickness of 0.05 millimeters to 5 millimeters, which can be rolled up. Thus, in addition to membranes in the strict sense having thicknesses below 1 mm, also, preferably, membranes are understood as sealing sheets, which are typically used for sealing tunnels, roofs, or swimming pools, in a thickness of typically 1 to 3 mm, in special cases even in a thickness of up to a maximum of 5 mm. Such membranes are usually produced by brushing, pouring, calendering, or extruding and are typically commercially available in form of rolls, or they are prepared on site. They can be made single-layered or multilayerd. It is clear to the person skilled in the art that membranes also can contain other additives and processing agents, such as fillers, UV and heat stabilizers, plasticizers, lubricants, biocides, flame retardants, antioxidants, pigments such as titanium dioxide or carbon black, and dyes. This means that, in the present document also, such membranes are designated as polyolefin membranes, PVC membranes, and soft PVC membranes, which are not made of 100% polyolefin, PVC, or soft PVC.

Most preferred is the one polyolefin membrane or a PVC membrane.

Materials suitable as a further substrate (S2) are inorganic substrates such as glass, glass ceramics, concrete, mortar, brick, tile, plaster, fiber cement, and natural stone such as granite or marble, metals or alloys such as aluminum, steel, nonferrous metals, galvanized metals; organic substrates such as wood, plastics such as PVC, polycarbonates, PMMA, polyester, epoxy resins, polyisocyanurate resins (PIR); coated substrates such as coated metals or alloys, as well as paints and varnishes. Particularly preferred as a further substrate (S2) are materials used as roofing base, i.e., preferably, the further substrate (S2) is selected from the group consisting of insulation foam based on polyisocyanurates (PIR), wood, galvanized sheet metal, concrete, fiber cement sheets, and sheetrock.

If needed, the substrates can be pretreated before the application of the adhesive or sealant. Such pretreatments include, in particular, physical and/or chemical cleaning processes, for example, grinding, sand blasting, brushing, or the like, or treatment with cleaning agents or solvents, or the application of an adhesion promoter, adhesion-promoter solution, or a primer.

Preferably, however, gluing is primerless.

In a further aspect, the invention relates to a composite item 1 exhibiting a plastic membrane (S1) 2 and a further substrate (S2) 3, which are joined together via an adhesive 4 which was obtained by a two-component aqueous dispersion adhesive, described above in detail, by means of mixing and curing.

A roof of a building is considered a preferred composite item.

It has been shown that this dispersion adhesive described here is ideally suited to gluing membranes in the contact process, whereby immediate strength is achieved. Furthermore it is shown that, surprisingly, the bonding to various bases is preserved, even after several weeks of storage at elevated temperature, for example, at 50° C. Finally, these adhesives and the composite items produced therewith are characterized by an excellent heat resistance and low plasticizer absorption. It is particularly surprising that with the present invention, the actually conflicting properties of good contact adhesion and low plasticizer absorption paired together can be achieved.

As a measure of capacity for contact adhesion, the peel resistance immediately after joining can be cited. It has been shown that the peel resistance $SW_0$, measured as described in detail in the examples of the present document, should have a value of at least 55 N/5 cm in order to have an acceptable capacity for contact adhesion.

It has been pointed out that the plasticizer absorption capacity can be used very well by a simple storage test, as described in detail for the examples of the present document. It has been shown that a plasticizer absorption determined in such a manner should be no more than 60% in order to be able to ensure adhesion for the long term.

BRIEF DESCRIPTION OF THE DRAWING

In the following, exemplary embodiments of the invention are described in greater detail with reference to the drawings. Identical elements in the different figures are provided with the same reference numerals.

Shown are.

The drawings are schematic. Only the elements essential for the immediate understanding of the invention are shown.

Figure 1:
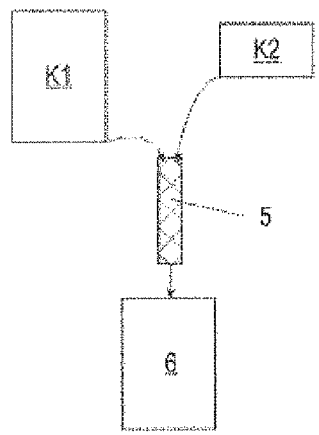
FIG. 1 a schematic representation of the mixing of the two components of the two-component aqueous dispersion adhesive.

FIG. 1 shows schematically that the first component K1 and the second component K2 of an aqueous two-component dispersion adhesive, as described in detail above, are mixed in the embodiment shown here by means of a mixer 5, and thus a mixed dispersion adhesive 6 is obtained.

Figure 2:
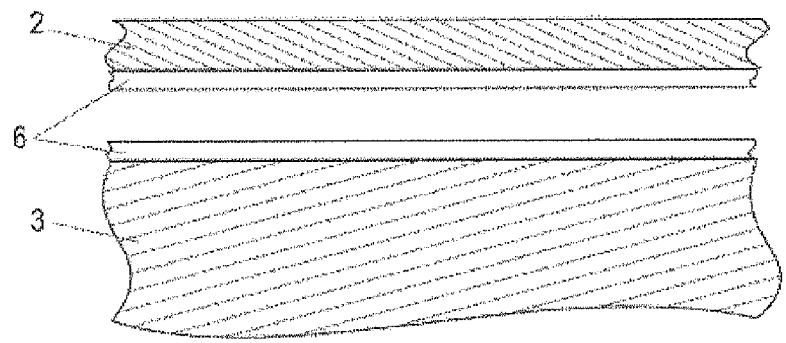
FIG. 2 a cross-section of a plastic membrane and substrate with applied mixed adhesive.

The dispersion adhesive 6 mixed in this manner is applied in a layered manner within the pot life of the dispersion adhesive, as shown schematically in cross-section in FIG. 2, onto a plastic membrane (S1) 2, in particular, a PVC membrane, and onto the surface of a further substrate (S2) 3, in particular, onto a concrete roof.

Figure 3:
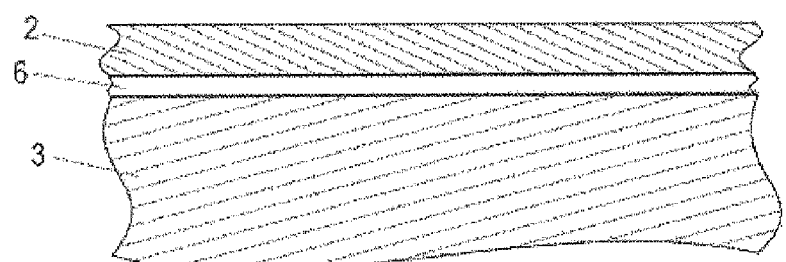
FIG. 3 a cross-section of a plastic membrane and substrate with applied mixed adhesive after joining.

After flashing off the adhesive, the plastic membrane (S1) 2, coated with adhesive 6, and the further substrate (S2) coated with adhesive 6 are joined to one another within the pot life, as is illustrated in the schematic cross-section of FIG. 3.

Figure 4:
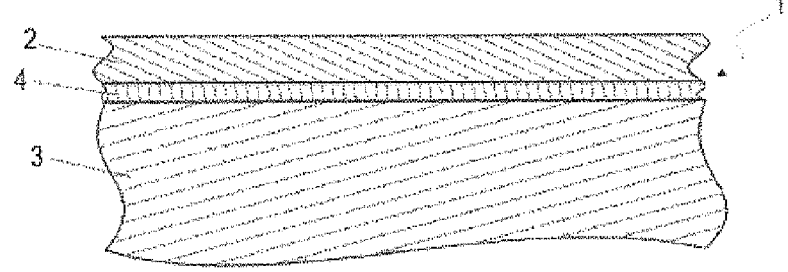
FIG. 4 a cross-section of a composite item.

After the joining, due to the chemical reaction, the curing of the adhesive takes place. Thus, as shown in the schematic cross-section of FIG. 4, a composite item 1 is obtained which exhibits a plastic membrane (S1) 2 and a further substrate (S2) 3, which are joined to one another via an adhesive 4 which was obtained from a two-component aqueous dispersion adhesive, described above in detail, by mixing and subsequent curing.

In a preferred embodiment, the composite item shown here is a roof of a building with a bonded PVC membrane.

LIST OF REFERENCE NUMERALS

1 Composite item
2 Plastic membrane S1
3 Further substrate (S2)
4 Adhesive
5 Mixer
6 Uncured adhesive after mixing the two components K1 and K2
K1 First component of the adhesive
K2 Second component of the adhesive

EXAMPLES

In the following, exemplary embodiments are cited which are intended to illustrate the invention described in more detail. It is understood of course that the invention is not limited to these exemplary embodiments described.

Preparation of Aqueous Two-Component Dispersion Adhesives

As first components, the components in Table 1 were used. When several components were used, the individual components specified by weight proportion were vigorously mixed with one another in an open vessel by means of a laboratory mixer with a dissolver disc. In the comparative examples, care was taken that the same amount of polymer was used.

TABLE 1

Two-component dispersions.

|  | Ref. 1 | Ref. 2 | Ref. 3 | REF. 4 | 1 | 2 | 3 | 4 |
|---|---|---|---|---|---|---|---|---|
| First component | | | | | | | | |
| PEPU[1] | 30 | | 130 | | 30 | 30 | 50 | 70 |
| PU ref[2] | | 26.6 | | | | | | |
| EVA-1[3] | | 100 | | 130 | 100 | 100 | 80 | 60 |
| EVA ref[4] | 92.3 | | | | | | | |
| Total: | 92.3 | 126.6 | 130 | 130 | 130 | 130 | 130 | 130 |
| Second component | | | | | | | | |
| HDI trimer[5] | 6.5 | 6.5 | 6.5 | 6.5 | 6.5 | 3.25 | 6.5 | 6.5 |
| IPDI trimer[6] | | | | | | 3.25 | | |

[1]PEPU-1: aqueous dispersion of an aliphatic polyether polyurethane having anionic groups, solids content: 40 wt. %, pH = 7.5, viscosity (Brookfield, 20° C.) = 20-200 mPa · s;
[2]PU ref: aqueous dispersion of a polyester polyurethane, solids content: 45 wt. %, pH = 8.5, viscosity (Brookfield, 23° C.) = 10-70 mPa · s;
[3]EVA-1: aqueous dispersion of an ethylene vinyl acetate copolymer, solids content: 60 wt. %, viscosity (Brookfield, 23° C.) = 2800-4800 mPa · s, Tg = 3° C.[7]
[4]EVA Ref: ethylene vinyl acetate copolymers, solids content: 65 wt. %, viscosity (Brookfield, 23° C.) = 1000-3000 mPa · s, Tg = −8° C.[7]
[5]HDI-trimer.: Hydrophilized trimer of HDI, NCO content = 21.8%, viscosity (23° C.): 1250 mPa · s
[6]IPDI trimer.: Hydrophilized IPDI isocyanurate, NCO content = 11%.
[7]Tg: glass transition temperature measured by DSC (maximum, RT -> −50° C., cooling rate: 10° K./min, held at −50° C. for 5 min, heating and recording the DSC curve −50° C. -> 100° C., heating rate: 10° K./min) on a Mettler Toledo DSC 821e with Huber TC 100 cryostat To 130, or 126.6, or 92.3 parts of the first component were added 6.5 parts of the second component composed of the polyisocyanate(s) indicated in Table 1, while stirring. After vigorous mixing, the thus-prepared dispersion adhesives were used immediately for the tests.

Test Results

As a measure of the capacity for contact adhesion, the peel resistance ($SW_0$) was measured as follows:

After mixing, a coating of the respective adhesive was applied by means of a brush to the surface of a popular softening-agent-containing PVC membrane with a width of 5 cm, and a wood panel. After drying, the composite was joined by means of a 5-kg pressure roller. Immediately after joining, the peel resistance of the composite was tested with a tensile-test machine (angle 90°, strain rate 100 mm/min) and reported in Table 2 as $SW_0$.

Furthermore, the peel resistance of the corresponding specimens was measured after 3 days of storage at 25° C. and 50% rel. humidity and reported in Table 2 as $SW_{3d}$ (wood). Furthermore, specimens with the substrate combination of galvanized steel and PVC were prepared and the peel resistance was tested after 3 days and reported in Table 2 as $SW_{3d}$ (metal). The peel resistance after 3 days is a measure of the final bond strength of the adhesive.

The plasticizer absorption behavior was determined by the following measurement:

From the mixed dispersion adhesives, membranes were cast with a wet membrane thickness of 0.5 mm. After complete drying of the membranes, they were weighed (mass=$m_0$) and placed in diisononyl phthalate. After 20 hours of storage at 50° C., the membranes were taken out, wiped well, and weighed again (mass=$m_x$). From the relative increase in mass, the plasticizer absorption was determined as follows:

$$\text{Plasticizer absorption} = (m_x - m_0)/m_0$$

The values so calculated are given in Table 2 as percentages in Table 2.

TABLE 2

Test results.

|  | Ref. 1 | Ref. 2 | Ref. 3 | REF. 4 | 1 | 2 | 3 | 4 |
|---|---|---|---|---|---|---|---|---|
| Contact adhesion $SW_0$ [N/5 cm] | 41 | 47 | 67 | 71 | 80 | 85 | 85 | 70 |
| $SW_{3d}$ (wood) [N/5 cm] | 130 | 90 | 105 | 106 | 135 | 145 | 125 | 110 |
| $SW_{3d}$ (metal) [N/5 cm] | 105 | 81 | 78 | 65 | 105 | 129 | 104 | 101 |
| Plasticizer absorption [%] | 160 | 20 | 248 | 35 | 27 | 27 | 39 | 57 |

The results from Table 2 point out that the references show either insufficient capacity for contact adhesion or a high softening-agent absorption, while the examples 1 to 4 exhibit an optimum combination of these properties. It is also evident from the comparison of examples 1 and 2 that an IPDI trimer/HDI trimer combination is advantageous.

The invention claimed is:

1. A two-component aqueous dispersion adhesive consisting of two components,
   wherein
   the first component contains
     at least one polyether-polyurethane polymer (PEPU);
     at least one ethylene vinyl acetate copolymer (EVA) having a glass transition temperature of greater than 0° C.; and
     water;
   and the second component contains at least one polyisocyanate.

2. The two-component aqueous dispersion adhesive according to claim 1, wherein the polyether-polyurethane polymer (PEPU) comprises anionic groups.

3. The two-component aqueous dispersion adhesive according to claim 1, wherein the polyisocyanate is a trimer of a diisocyanate.

4. The two-component aqueous dispersion adhesive according to claim 1, wherein the polyisocyanate is a trimer of 1,6-hexamethylene diisocyanate (HDI) or 1-isocyanato-3,3,5-trimethyl-5-isocyanatomethyl-cyclohexane (=isophorone diisocyanate or IPDI).

5. The two-component aqueous dispersion adhesive according to claim 1, wherein the second component comprises a mixture of a trimer of 1,6-hexamethylene diisocyanate (HDI) and a trimer of 1-isocyanato-3,3,5-trimethyl-5-isocyanatomethyl-cyclohexane (=isophorone diisocyanate or IPDI).

6. The two-component aqueous dispersion adhesive according to claim 1, wherein the composition is substantially free of components with aromatic structures.

7. The two-component aqueous dispersion adhesive according to claim 1, wherein the weight ratio of ethylene vinyl acetate copolymer (EVA) to polyether-polyurethane polymer (PEPU) has a value from 10 to 0.8.

8. The two-component aqueous dispersion adhesive according to claim 1, wherein the proportion of water is 30-70 wt. %, based on the total weight of the two-component aqueous dispersion adhesive.

9. The two-component aqueous dispersion adhesive according to claim 1, wherein the dispersion adhesive is substantially free of volatile components (VOCs).

10. A method for gluing two membranes together, comprising gluing a first membrane to a second membrane with the dispersion adhesive according to claim 1.

11. A method for gluing a membrane to a substrate, comprising the steps of
 (i) mixing the two components of a two-component aqueous dispersion adhesive according to claim 1,
 (ii) applying the aqueous dispersion adhesive according to step (i) to the surface of a plastic membrane and to the surface of the substrate;
 (iii) flashing off the aqueous dispersion adhesive applied according to step (ii); and
 (iv) joining the plastic membrane and the substrate by contacting the dispersion adhesive present on the plastic membrane and on the substrate.

12. The method for gluing according to claim 11, wherein the plastic membrane is a polyolefin membrane or a PVC membrane.

13. The method according to claim 12, wherein the gluing takes place primerless.

14. A composite item comprising a plastic membrane and a further substrate, which are joined to one another via an adhesive obtained from a two-component aqueous dispersion adhesive according to claim 1.

15. The composite item according to claim 14, wherein the composite item is a roof of a building.

* * * * *